US006769611B2

(12) United States Patent
Miller et al.

(10) Patent No.: US 6,769,611 B2
(45) Date of Patent: Aug. 3, 2004

(54) METHOD AND APPARATUS FOR THE SECURE DELIVERY OF GOODS

(76) Inventors: Michael Robert Miller, High Cross, White Horse Road, East Bergholt, Suffolk CO7 6TR (GB); Joan Margaret Miller, High Cross, White Horse Road, East Bergholt, Suffolk CO7 6TR (GB); Robert James Miller, Ground floor flat, 218 Friern Road, London SE22 0BB (GB); Richard Anthony Kay, Kerkira, Old Edinburgh Road, Minigaff, Newton Stewart DG8 6PL (GB); Andrea Merylyn Kay, Kerkira, Old Edinburgh Road, Minigaff, Newton Stewart DG8 6PL (GB); Lesley Jane Kay, Greencotes, Warden, Hexham, Northumberland NE46 4SS (GB); Nicholas Steven Booth, Greencotes, Warden, Hexham, Northumberland NE46 4SS (GB)

( * ) Notice: Subject to any disclaimer, the term of this patent is extended or adjusted under 35 U.S.C. 154(b) by 0 days.

(21) Appl. No.: 10/296,054

(22) PCT Filed: May 25, 2001

(86) PCT No.: PCT/GB01/02336

§ 371 (c)(1), (2), (4) Date: Nov. 21, 2002

(87) PCT Pub. No.: WO01/91074

PCT Pub. Date: Nov. 29, 2001

(65) Prior Publication Data

US 2003/0121968 A1 Jul. 3, 2003

(30) Foreign Application Priority Data

May 25, 2000 (GB) .......................................... 0012844

(51) Int. Cl.[7] .............................................. G06K 5/00

(52) U.S. Cl. ...................... 235/382; 235/375; 235/487

(58) Field of Search ............................... 235/382, 380, 235/381, 375, 470, 487, 332.5, 383; 340/5.2, 5.22, 5.23, 5.5, 5.6, 5.7, 5.73, 539.19

(56) References Cited

U.S. PATENT DOCUMENTS

| | | | | | |
|---|---|---|---|---|---|
| 4,773,042 | A | | 9/1988 | Edwards | |
| 4,803,348 | A | | 2/1989 | Lohrey et al. | |
| 4,894,717 | A | * | 1/1990 | Komei | 348/150 |

(List continued on next page.)

FOREIGN PATENT DOCUMENTS

| | | | |
|---|---|---|---|
| EP | 0 377 535 | A1 | 7/1990 |
| EP | 0 821 518 | A2 | 1/1998 |
| FR | 2 563 987 | A1 | 11/1985 |

(List continued on next page.)

*Primary Examiner*—Thien M. Le
*Assistant Examiner*—Edwyn Labaze
(74) *Attorney, Agent, or Firm*—Breiner & Breiner, L.L.C.

(57) ABSTRACT

When an order for goods (18) is placed via the Internet (14) for later delivery, a supplier (16) provides to a purchaser (12) via the Internet or other means a consignment unlock barcode; the purchaser prints out a copy of the consignment unlock barcode and the supplier attaches a copy (20) of a related unlock barcode to the goods (18). At the purchaser's premises is a secure container (22) with an electronic lock (32) and an external barcode reader (36). The purchaser programs the lock, by means of an exclusive master code and the supplier-generated consignment delivery code, to open when presented with the related unlock code. When a delivery driver presents the barcode (20) on the goods (18) to the reader (36), a control circuit (42) causes the electronic lock (32) to open. A second barcode reader (46) within the container (22) allows an infrared or radio receipt signal to be transmitted to a hand held infrared transceiver (52) after the securable container has been relocked.

9 Claims, 3 Drawing Sheets

U.S. PATENT DOCUMENTS

| | | | | | |
|---|---|---|---|---|---|
| 5,223,829 | A | * | 6/1993 | Watabe | 340/5.73 |
| 5,235,165 | A | * | 8/1993 | Sukegawa et al. | 235/380 |
| 5,475,378 | A | * | 12/1995 | Kaarsoo et al. | 340/5.6 |
| 5,979,750 | A | * | 11/1999 | Kindell | 232/19 |
| 6,010,064 | A | * | 1/2000 | Umeda et al. | 235/375 |
| 6,344,796 | B1 | * | 2/2002 | Ogilvie et al. | 340/568.1 |

FOREIGN PATENT DOCUMENTS

| | | | | | |
|---|---|---|---|---|---|
| FR | 2 643 479 | A1 | | 8/1990 | |
| GB | 2 302 976 | A | | 2/1997 | |
| WO | WO 01/35358 | A1 | | 5/2001 | |
| WO | 01/52199 | | * | 7/2001 | G07F/7/00 |

* cited by examiner

METHOD AND APPARATUS FOR THE SECURE DELIVERY OF GOODS

BACKGROUND OF THE INVENTION

This invention relates to a method and apparatus for the secure transfer of goods, i.e., to a method by which goods can be delivered to premises and securely stored in the absence of any person to receive the goods, or collected in the absence of any person.

A common irritation in today's society is the need for a householder to be present to take delivery of goods when the time of delivery is frequently defined over a wide time band. With the rapidly-expanding use of the Internet and other distance selling means to place orders for goods, this situation is likely to occur even more frequently.

In U.S. Pat. No. 5,774,053 Porter there is a disclosure of a storage and delivery system in which goods are delivered into or collected from a storage enclosure having a lock controlled by a keypad; each vendor, such as a laundry business, a fast food outlet and a frozen food supplier, has a vendor code which is stored in a keypad controller. When a vendor enters a correct vendor code the enclosure is unlocked and goods can be collected or delivered.

Disadvantages of such an arrangement may be that a code is miskeyed so that the enclosure remains locked, and that dishonest persons can use a valid vendor code to open a container and steal the contents.

It is an object of the invention to provide a solution to the problem.

SUMMARY OF THE INVENTION

According to the invention a method for securely ordering and taking delivery of goods comprising the steps of:

- a purchaser placing an order for goods with a supplier;
- characterised by the supplier sending to the purchaser an unlock programming code associated with the goods and associating a visible representation of a related code with the goods;
- the purchaser programming said unlock programming code into a programmable code reader means on an electronically lockable container accessible by a delivery driver;
- the delivery driver entering the related unlock code on the programmable code reader means;
- the programmable code reader means permitting the container to be opened;
- the delivery driver placing the goods in the securable container; and
- the container being once more electronically locked.

Thus the unlock code provided by the supplier is unique to each delivered item, and the risk of miskeying a code is eliminated because visible representations of the code are used.

Preferably the unlock code is a barcode and a copy of a related barcode is attached to the goods or the packaging for the goods. The related barcode can be identical to the unlock programming code, or can contain a different number of digits/elements. Usually the unlock programming code will contain more elements than the related code.

Also according to the invention, a secure container for delivery or collection of goods comprising a container having an electronic locking means; characterised by a barcode reader means arranged to read an externally-presented visible barcode; and a control circuit programmable to recognize an unlock code, arranged so that on presentation of said visible barcode to the barcode reader means, the electronic lock permits the container to be opened.

BRIEF DESCRIPTION OF THE DRAWINGS

The invention will be described by way of example only with reference to the accompanying drawings in which.

DETAILED DESCRIPTION OF THE PREFERRED EMBODIMENTS

Figure 1:
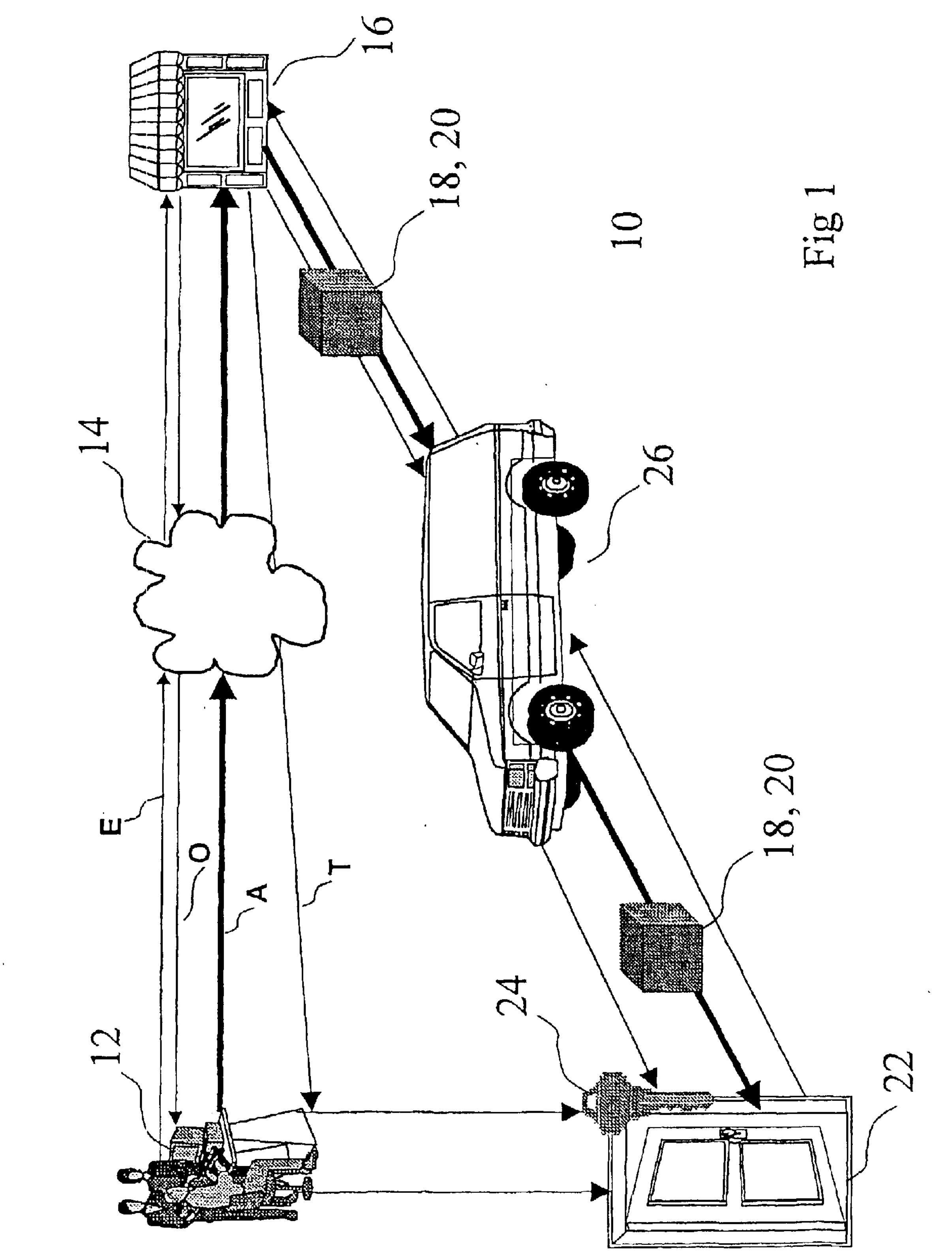
FIG. 1 illustrates schematically the process for making a secure delivery of goods.

In the purchase and secure delivery system 10 of FIG. 1, a purchaser 12 sends an enquiry E via the Internet 14 to a supplier 16. The supplier returns an offer O via the Internet and the purchaser sends an acceptance A via the Internet, thus a legal contract is made.

The supplier 16 creates an individual code for the goods to be supplied, conveniently in the form of a barcode, which will be referred to in this specification as an unlock code. A physical representation of the barcode 20 is attached to the goods 18 or their packaging, and will in this example be referred to as a driver unlock code. The supplier 16 sends an order acknowledgement or token T over the Internet 14 to the purchaser 12, the token T also containing a copy of the barcode, which will be referred to as a consignment unlock code. The purchaser 12 prints out a copy of this barcode by standard printing means.

The purchaser 12 has available an externally accessible container 22 which has electronically lockable means, as indicated at 24. The container has external and internal barcode readers (not shown in FIG. 1) and a control circuit which allows the purchaser 12 to enter the consignment unlock barcode provided by the supplier 16, e.g. via the external barcode reader. The purchaser also has a purchaser master code which operates the electronically lockable means, such as a master barcode.

When the goods 18 are to be delivered by a vehicle 26, the supplier 16 supplies the driver with delivery instructions and goods with the driver unlock code, the physical representation of the barcode, securely affixed to the goods or the packaging. On arrival, the driver positions the visible barcode on the goods adjacent to the external barcode reader, the driver unlock code is sensed, the electronic lock is released, and the container 22 can be opened. The goods 18 are placed inside and the container is once more closed.

Figure 2:
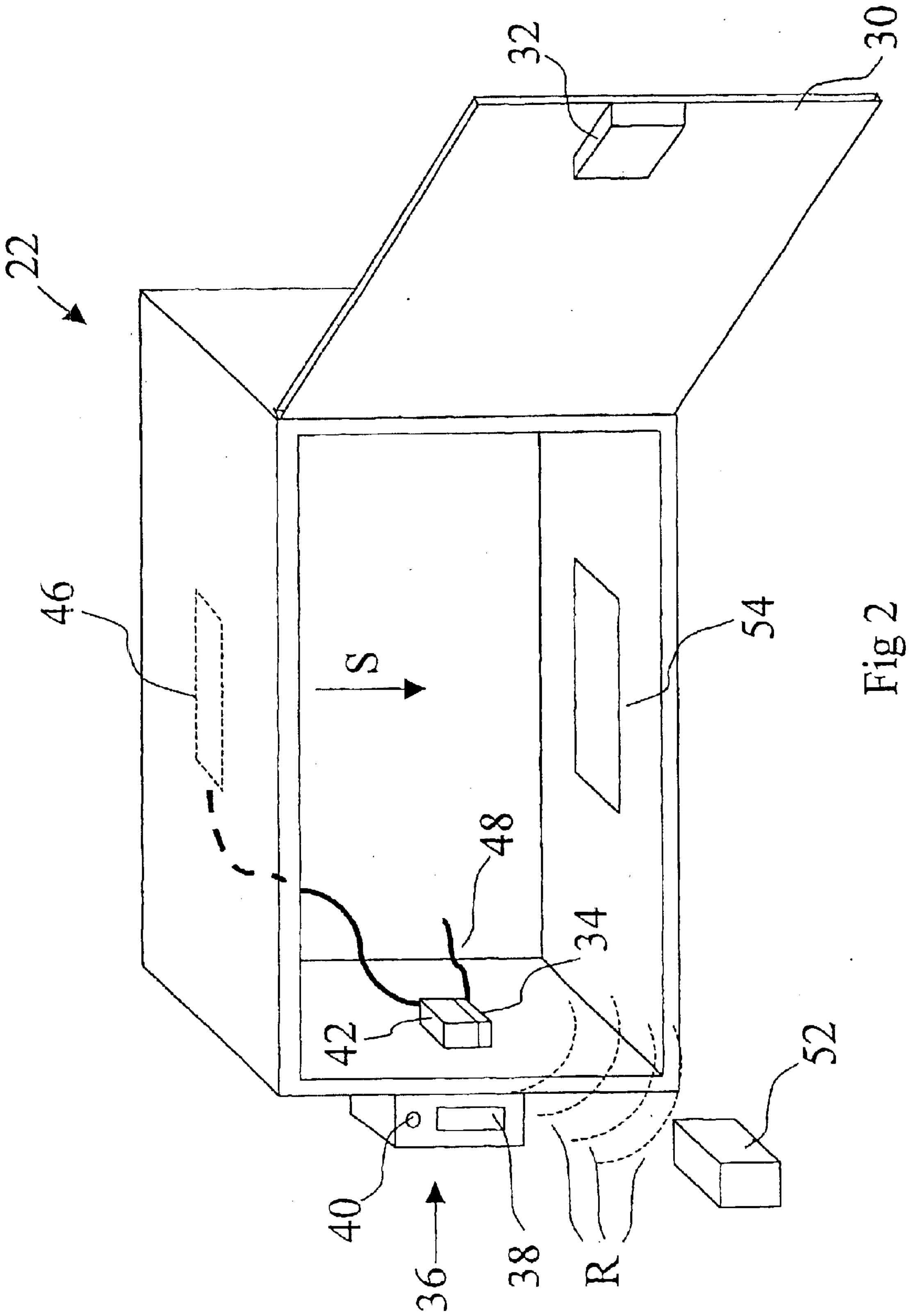
FIG. 2 illustrates schematically a secure container according to the invention.

A suitable container is shown schematically in FIG. 2 and has a door 30 with an electronic bolt 32 controlled by a bolt control circuit 34 inside the container 22. Outside the container is a first barcode reader 36 with a reading window 38 and an indicator lamp 40. The barcode reader 36 and the bolt 32 are controlled by a control circuit 42 within the container. The circuit 42 also controls a second barcode reader 46 on the ceiling of the container (shown dotted). All electrical components are mains powered via a cable 48 which passes to a supply within the purchaser's house. There may be a battery back-up supply (not shown). Alternatively the components may be solar powered. In event of power failure, default is to locked state but a real physical key would allow owner to get inside to retrieve any contents.

When a delivery is expected, the purchaser 12 prepares the container 22 by presentation of the purchaser master barcode to the reading window 38 of the external barcode reader 36; use of the purchaser master barcode provides added security. The control circuit 42 causes a "ready" indicator to show (e.g. the lamp 40 to light) and the purchaser 12 then presents the printed-out copy of the consignment unlock barcode to the reading window 38 of the external barcode reader 36. The control circuit 42 indicates that it has received the consignment unlock code by lighting the indicator lamp 40 for a pre-determined time, showing that the lock is programmed and the door securely closed.

The delivery driver arrives and presents the visible barcode 20 attached to the goods or their packaging to the reading window 38. The barcode reader 36 reads the barcode which is recognized by the control circuit 42 as the driver unlock code; the circuit 42 instructs the electronic bolt to permit the door to be opened, and the goods are placed inside the container 22 with the barcode 20 on the upper surface of the goods 18. The internal barcode reader 46 now scans the barcode on the goods as indicated by the arrow S. If the barcode 20 on the goods is not visible, the lamp 40 is arranged to flash and the driver repositions the goods until the lamp stops flashing, then closes the door 30. When the barcode reader 46 can correctly read the barcode 20 on the goods 18, the circuit 42 recognizes it as the driver unlock barcode, and operates the electronic bolt 32 to secure the container 22. Optionally a further indicator lamp (not shown) is provided to confirm to the driver that the container is properly locked before he departs. The circuit 42 also sends an infrared signal R which is sensed by a hand-held infrared receiver 52, in the possession of the delivery driver. The signal R acts as a delivery receipt but of course the goods are still delivered with a "goods unexamined" status. The driver then returns to the supplier 16 with the hand held receiver 52, and the delivery receipt is recorded by the supplier 16.

The receipt could alternatively be issued into a and-held device by a DIN-type connector attached to the circuit 42 or other suitable transmission means such as radio.

In a variation, the electronic record of delivery can be downloaded into the supplier's Enterprise Resource Planning (ERP) system and can trigger payment by the purchaser 12. An optional addition would be for the supplier's ERP system to send to the purchaser 12 an email or Short Message Service message to a mobile telephone, confirming delivery. This may be convenient if the purchaser 12 is away from the delivery site for long periods.

As an additional security measure, the container 22 optionally contains a pressure pad 54 which can sense the weight of the delivered goods which can then be matched to a weight coded within the consignment unlock barcode. This prevents a dishonest delivery driver from removing the physical representation 20 on the goods 18 and leaving only the label in the container 22.

At a convenient time, the purchaser 12 uses the purchaser master barcode card to open the container 22 and remove the goods.

The control circuit 42 is arranged to open the electronic bolt 32 only once on presentation of the driver unlock code. Thus a dishonest delivery driver cannot obtain a receipt for the goods, open the container 22 a second time, and remove the goods.

The consignment unlock barcode sent to the purchaser can be identical to the driver unlock barcode affixed to the goods, or it can contain additional elements, for example to indicate the weight of the goods as explained above. Alternatively there can be code to indicate that a delivery is expected on a certain day, thus instructing the container to respond to the driver unlock barcode only on that day.

The consignment unlock barcode supplied to the purchaser can also be related to the driver unlock barcode on the goods by application of a simple algorithm for added security; for example Public Key Encryption can be used.

Figure 3:
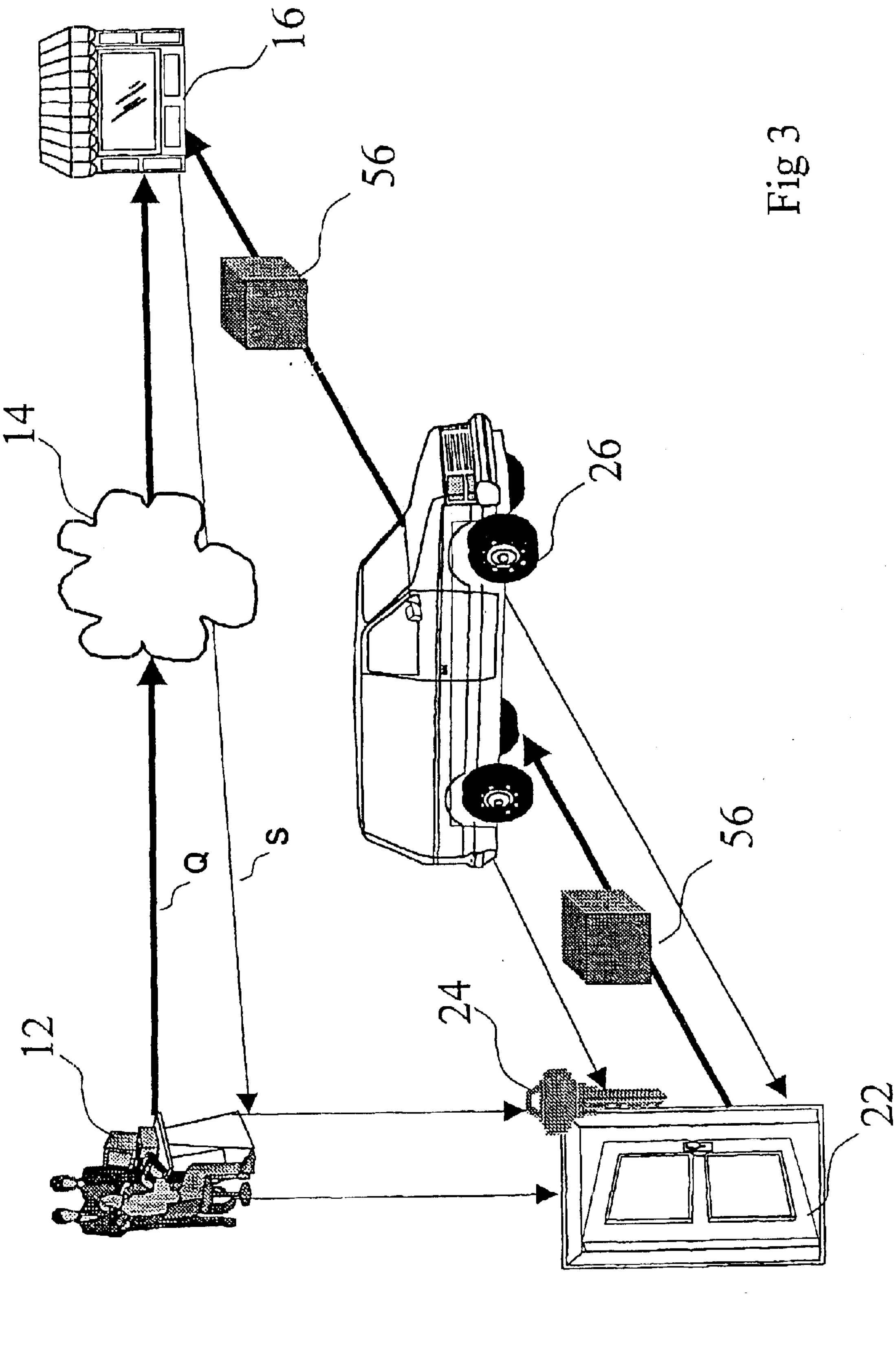
FIG. 3 illustrates schematically a process for securely returning faulty goods.

FIG. 3 shows a system for the secure return of faulty or unwanted "on approval" goods. The purchaser 12 sends a return request Q over the Internet 14 to the supplier 16, who sends to the purchaser a return number/token S, including a return consignment unlock barcode, which is printed out by the purchaser 12 and placed on the goods to be returned 56. The goods 56 are placed in a secure container 22 which is programmed with the unlock code as before. The delivery driver has a copy of the driver unlock barcode which is used to open the container door, and the goods 56 are returned to the supplier 16.

An indicator (e.g. lamp 40) confirms to the driver that the door has been properly closed.

The fact that the container 22 has been opened by use of the correct driver unlock code acts as a log for the return of the goods 56. This is the position whether or not the driver leaves a paper receipt for the goods 56.

As an alternative to the secure return of faulty or unwanted goods purchased by a purchaser, the arrangement can be modified (in a minor way easily made by a person skilled in the art) for use for the collection of goods for service. For example, a householder or office occupier requiring laundry or clothes-cleaning or equipment repair services can arrange for secure pick-up of the goods. The goods can be returned in the same way as delivery of purchased goods.

In the embodiment described above the secure container 22 is a separate container firmly attached to, or built into, the purchaser's house or business premises. Alternatively, the secure container can be a garage or shed or the like, fitted with the electronic bolt and control circuit etc. The container can be insulated or refrigerated to permit delivery of frozen goods.

While the invention has been described with respect to use of a copy of the barcode as a consignment programming code for the container 22, alternative methods of programming can be used. For example a digital keypad could be provided on the container 22, and the token T would then be an alphanumeric code to generate a barcode in the control circuit 42; this would be usable if the purchaser did not have access to a printer to print out a programming barcode. The driver would still bring his driver unlock token as a barcode. The consignment unlock barcode or other code can be delivered by mail or fax.

While the embodiment has been described with respect to orders placed over the Internet, the invention is equally applicable to orders placed by telephone, by fax, in writing, or in person at a supplier's premises.

While the embodiment has been described with respect to the use of a barcode and barcode reader for reading the driver's unlock code and the consignment identity, any form of electronic labelling such as a strip responsive to radio-frequency may be used in conjunction with a proximity detector; the requirement is that the electronic label must be unique to each delivery or returned item.

In one variation, a mobile telephone can be used to supply a text message as an unlock code, and the mobile or a laptop or palm top computer having an infrared transponder, can be used to transmit the unlock code to the control circuit 42. Yet another variation is the use of a radio data receiver such as a low-cost radio-paging device built into the secure container both to receive the consignment unlock code and to transmit it to the control circuit 42. Where two-way radio or radio-paging service is available, this can also be used to transmit a delivery receipt to the supplier.

For additional security, the purchaser's master code should be regeneratable at intervals by use for example of a PC running software protected by a log-in identity and password/Personal Identification Number.

In the container shown in FIG. 2, as an alternative to the provision of both internal and external barcode readers, a single reader plus a mirror system to allow reading of an externally presented barcode and also the barcode attached to the goods within the container may be used.

While the invention has been described with respect to delivery at single-occupant premises, it is also applicable to a multi-tenanted building. Each resident could have an individual code, while the external access door could be programmed to allow any occupant to allow access by the driver to the building on a once-only basis. There could either be a separate secure container for each occupant, or a single container for the whole building if there is a low risk of two or more deliveries on the same day.

Alternatively, multiple deliveries to the same container can be made, with the control circuit 42 having a memory device such as a non-volatile EEPROM to record all the deliveries, and the internal barcode reader 46 being arranged to ensure that all delivered goods are still present before a receipt is issued for the latest delivery. As an alternative, the receipt for new goods could indicate that a previously delivered item was no longer visible to the internal barcode reader 46.

The invention could also be used to enable out of hours delivery to commercial premises, affording better utilisation of delivery resources.

If the purchaser 12 loses the barcode before the goods 18 are delivered, or suffers a printer failure, a duplicate could be provided on condition that the purchaser provides security information, such as a postcode, and a Personal Identification Number sent by the supplier 16 as part of the order process, plus optionally an order number.

It is expected that a method according to the invention will be operated by an overall proprietor servicing a number of supply companies; the proprietor will supply each supply company with unlock-code generating software which ensures that each unlock code is unique. Further, the software can be time-limited or usage-limited so that the proprietor can apply financial control to the supply companies.

What is claimed is:

1. A method for securely ordering and taking delivery of goods comprising the steps of:

a purchaser placing an order for goods with a supplier;

the supplier sending to the purchaser an unlock barcode associated with the goods and placing a related barcode on the goods or packaging thereof;

the purchaser programming said unlock barcode into a programmable barcode reader means on an electronically lockable container accessible by a delivery driver;

the delivery driver entering the related barcode into the programmable barcode reader means;

the programmable barcode reader means permitting the container to be opened;

the delivery driver placing the goods in the container once opened; and locking the container once the goods are placed in the container.

2. The method according to claim 1 wherein after the goods have been placed in the container, the related barcode on the goods or the packaging thereof is read again, a comparison is made of the related barcode and the unlock barcode, and if a match therebetween is present, the container is electronically locked.

3. The method according to claim 2 further comprising initiating transmission of a receipt message for reception by a portable receiver external to the container.

4. The method according to claim 1 in which the purchaser opens the container to remove the goods by means of a purchaser master barcode card.

5. The method according to claim 1 in which the purchaser places an order for goods over the Internet, and the supplier sends the unlock barcode associated with the goods via the Internet.

6. The method according to claim 1 wherein the container comprises an electronic lock; a barcode reader means arranged to read an externally presented barcode; and a control circuit programmable to recognize an unlock barcode, arranged so that presentation of said unlockable barcode to the barcode reader means causes the electronic lock to permit the container to be opened.

7. The method according to claim 6 wherein the container further comprises means to read a copy of the unlock barcode secured to the goods or the packaging thereof when positioned within the container, the control circuit then causing the electronic lock to lock the container.

8. The method according to claim 6 wherein the control circuit is arranged to cause the electronic lock to permit the container to be opened only once on external presentation of the unlock barcode to the barcode reader means.

9. A method for secure pick-up of goods comprising steps of:

a premises occupier requesting pick-up of goods;

a service provider sending to the premises occupier an unlock barcode code;

the premises occupier placing the goods in an electronically lockable container accessible by a delivery driver, the container having a programmable barcode reader means, and programming the container to be unlockable only on entry of a related unlock barcode;

electronically locking the container;

a delivery driver entering said related unlock barcode into the programmable barcode reader means;

the container being electronically unlocked; and the delivery driver removing from the container the goods to be picked up.

* * * * *